May 4, 1954   C. W. CAMERON   2,677,559
PIPE COUPLING LATCH
Filed Sept. 3, 1952
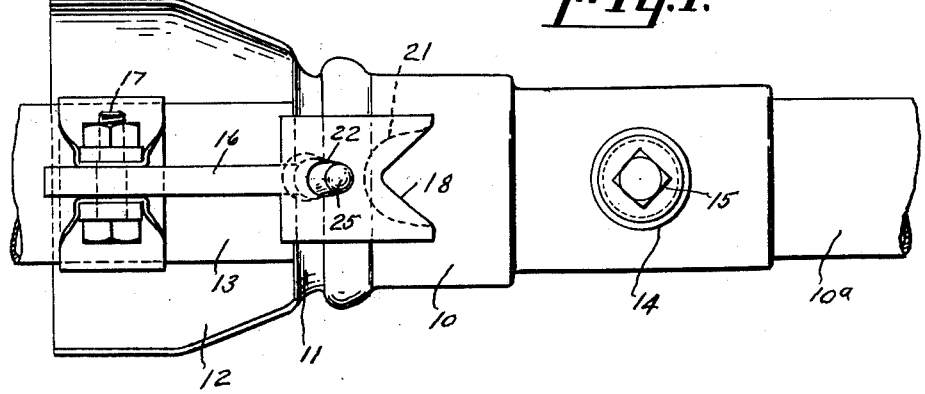
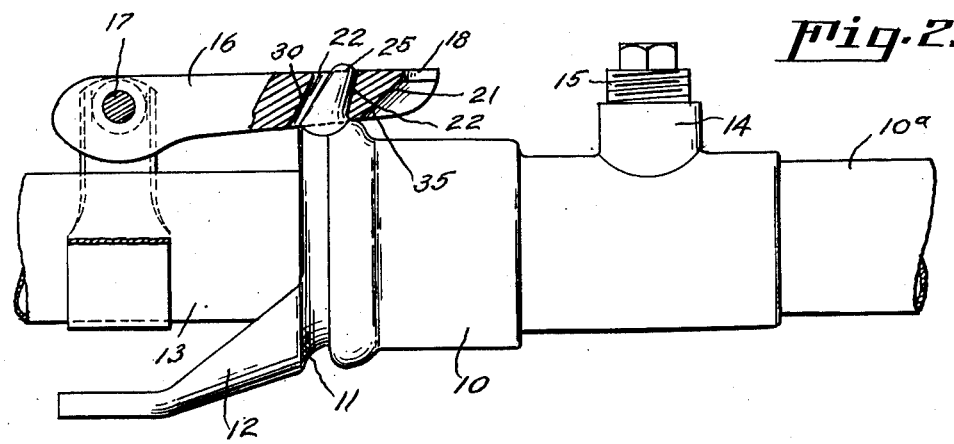
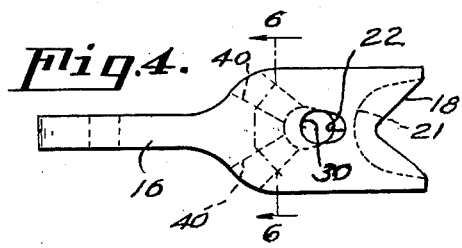
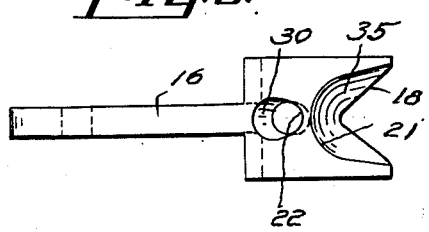
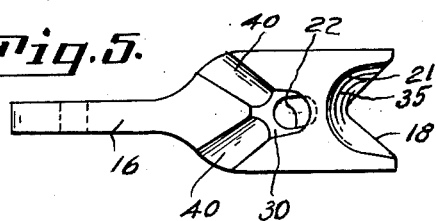
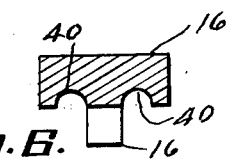
INVENTOR.
Charles W. Cameron.
BY
James C. Hamilton, Atty Patented May 4, 1954

2,677,559

UNITED STATES PATENT OFFICE 2,677,559

PIPE COUPLING LATCH

Charles W. Cameron, Santa Rosa, Calif.

Application September 3, 1952, Serial No. 307,599

1 Claim. (Cl. 285—170)

My present invention relates to latches and more particularly to pipe coupling latches for use with irrigation piping.

The principal object of my invention is an improved pipe latch for irrigation pipe couplings.

Another object is a latch of the above mentioned type in which the latch is self-aligning with an anchor means when engaging two pipe lengths together.

Another object is an improved latch of the above mentioned type which is self-disengaging when it is desired to disconnect pipe lengths.

Still another object is a pipe coupling latch above mentioned which will slightly rotate the pipe length being disengaged.

Other objects and novel features comprising the operation and construction on my invention will be more apparent as the description of the same progresses.

In the drawings illustrating my invention:

Fig. 1 is a plan view of the latch in a locked position on the joint end of a pipe, the portion of the pipes comprising the male and female ends are shown broken off from the remainder of said pipes;

Fig. 2 is a partial side elevation and broken-out cross-section of Fig. 1, the pipe ends being broken off and the clamp strap which binds the latch on the left-hand pipe being broken off as indicated in cross-section;

Fig. 3 is a bottom plan view of the latch bar shown in Figs. 1 and 2;

Fig. 4 is a top plan view of a slightly modified latch bar;

Fig. 5 is a bottom plan view of the modified latch bar shown in Fig. 4, and

Fig. 6 is a cross-section taken on the line 6—6 of Fig. 4.

Referring more in detail to the drawings, 10 indicates the female end of an irrigation pipe joint which is provided with a bell-shaped end 11 to which is affixed a lower skid plate 12. Pipe 13 is slid up the inclined area of the skid plate 12 and telescoped into the pipe joint 11 where it passes through a rubber ring provided for the purpose of water sealing but not shown as it is not concerned with the present invention.

The pipes may be of various lengths and are provided with a plurality of screw outlet portions as indicated at 14 into which are screwed conventional spray nozzles or plugs 15 as desired. The outlets are usually arranged in straight lines on the pipes.

The pipe 13 is provided on its opposite end with a joint similar to that shown in 9 and 10, and the opposite end of pipe 10a is plain and fitted with a latch bar as shown on pipe 13 in the drawings.

The latch bar 16 is pivoted on the rear end over a bolt 17 which also clamps the latch in the desired horizontal position of the pipe 13 by means of the strap 17 but leaving the latch bar 16 free to swing up and down.

The front end of the latch bar 16 is forked at 18 and cut back on the under side at an angle 35 and at the same time is curved at 21. The wide body of the latch bar 16 is further provided with a forwardly slanted opening 22 of conical shape, the top of the cone being the smaller end. This opening 22 is slightly elongated toward the rear portion as clearly shown in Fig. 2.

On the forward edge of the bell portion of the pipe joint 10 is a conical post-like member 25 which is pitched forward similar to the opening 22. The back wall of the opening 22 is undercut to form an inclined surface 30 similar to the inclined surface 35 on the front of the latch bar.

In joining the pipes 10a and 13 together, the free end of the pipe 13 is slid up on the skid portion 12 and telescoped into pipe joint 10 and pushed forward. The forked end 18 aligns the pipe 13 up properly by rotating it slightly as the forked end 18 engages the conical member 25. The area 35 on the latch bar 16 engages the rearward sloping side of the conical member 25 causing the latch bar 16 to pivot on the bolt 17 and finally drop the latch bar over the top of the portion 25, as shown in Figs. 1 and 2. When water pressure is admitted to the pipe line the conical member 25 engages tightly in the forward portion of the conical opening 22.

The locking of the conical portion in the opening 22 of the latch bar is important because it prevents any side motion of a rotational nature at the lock preventing the line of many joined pipe sections from slightly rotating a little at each joint by vibration so that the line of sprinkler valves can twist around between two ends of a line of pipes. My present invention reduces this undesirable feature present in most apparatus of this character to a minimum.

When it is desired to disjoint sections of the pipe line, the pipe 13 is pushed forward causing the sloping side 30 of the conical opening of the latch bar to ride up on the cone 25, then by turning the pipe 13 slightly to the right or left-hand side the pipe 13 may be completely pulled out of contact with the other pipe.

Figs. 4 and 5 show a slightly modified forward portion of the latch bar 16 in which the under side of the forward portion is provided with converging grooves 40 which enter the lower portion of the conical opening 22 and lead in opposite directions to the outside of the thickened portion of the latch bar. The purpose of the grooves 40 is to engage the top end of the conical member 25 and guide it outwardly from the latch bar. This action causes the pipe 13 to slightly rotate so that all that is necessary to disengage the pipe line is to push the pipe 13 forward and it will cause the latch bar 16 to not only disengage from the conical member 25 but also turn the pipe 13 permitting it to be withdrawn from the other pipe.

While I have shown the invention somewhat in detail yet it is to be understood that I may vary the proportions and sizes and positions of the various elements within wide latitude while still remaining within the spirit of the appended claim.

Having thus described my invention what I claim as new is:

An improved latch assembly for joining the male and female ends of irrigation pipe comprising, a female pipe end having a lower angularly disposed pan portion and top conical extension post, said post being pitched away from the plane of the open end of the female pipe end, a pivoted latch member pivoted on a free male end of a second pipe, said latch having a central tapered passage way, the said passage way having longitudinally elongated tapered sides tightly engaging over the said extension post on said female pipe end, the under side of said latch member having a tapered inclined surface forward of said passage way for riding up over the said post when said pipes are telescoped together, angularly disposed grooved located on the under side of said latch rearwardly disposed of said passage way, the angle of said angularly disposed grooves having an apex in the central portion of said passage way, the opposite ends of said angularly disposed grooves terminating on the exterior sides of said latch, said angularly disposed grooves being for the purpose of engaging said post and turning said male pipe end when said male pipe end is forced into said female end for the purpose of disengaging said pipes by an operator from a remote position with a respect to said latch.

References Cited in the file of this patent

UNITED STATES PATENTS

| Number | Name | Date |
|---|---|---|
| 1,481,392 | Schawrow | Jan. 22, 1924 |
| 2,244,396 | Kellaher | June 3, 1941 |
| 2,572,419 | Wyss | Oct. 23, 1951 |